June 3, 1952     K. HEFEL     2,599,387
POWER TRANSMISSION UNIT
Filed July 26, 1947
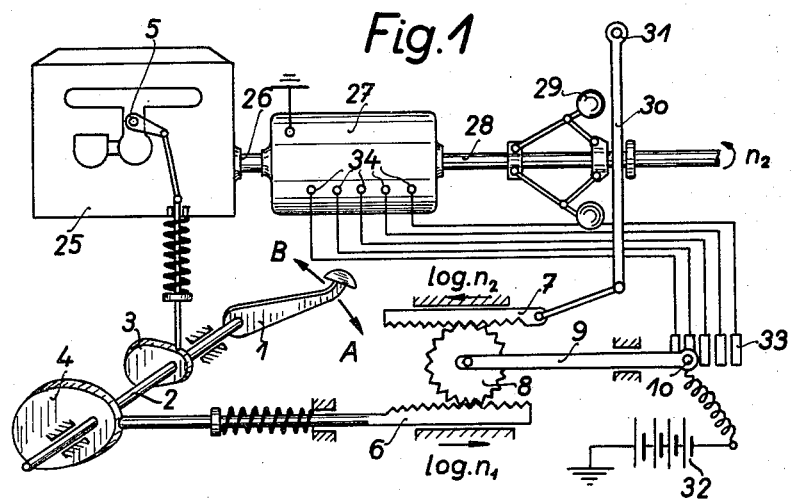
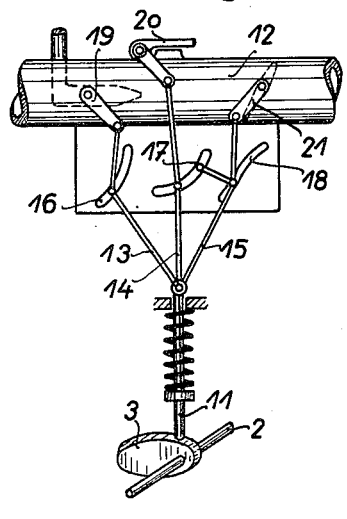
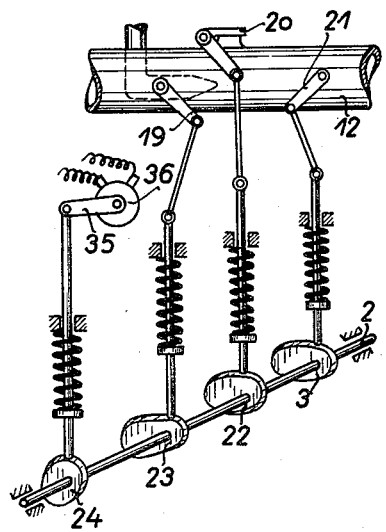
KARL HEFEL
INVENTOR
BY
Richardson, Davis and Nordon
his ATTORNEYS.

UNITED STATES PATENT OFFICE 2,599,387

POWER TRANSMISSION UNIT

Karl Hefel, Innsbruck, Tyrol, Austria

Application July 26, 1947, Serial No. 763,891
In Germany April 17, 1942

1 Claim. (Cl. 74—472)

This invention refers to a control device for automotive vehicles, having power drives, consisting of an engine, a transmission gear a driving and a driven shaft and the control or change-over means of the transmission gear. The subject matter of the invention is an automatic control operating in harmony with a prescribed regulation characteristic. This regulation characteristic is a graph assigning to each individual driving or braking output value of the engine one sole position of the fuel supply regulation organ and one sole speed (R. P. M.). Consequently the top or governing value is the engine output desired by the driver, whereas the two depending or subordinate values are the position of the fuel supply regulating organ in the following named $a$ values, and the presumed or theoretical number of revolutions of the engine $n_1$. Considering, however, that these two values are not equal functions of the engine power or output, but depend upon it according to different laws, they call for a separate control by a special device for each. Whilst the entire engine braking range is characterized by the throttle valve being kept closed by the one control device, the other control device operates in the direction of an increase of $n_1$, whenever the driver requires a higher braking output, and hence makes the necessary adjustments. The same happens vice-versa, whenever the driver requires a higher output of positive force in driving. In the latter case the throttle valve remains fully opened from a certain output value onwards, while the engine speed continues increasing, until the engine output has reached the value set or prescribed by the driver.

In contradistinction to the above, the automatic controls hitherto used confined themselves to action either on the engine speed (R. P. M.) or on the ratio of transmission, independently of the throttle valve position. In other words, as soon as the throttle valve was completely opened or perfectly closed, the R. P. M. of the engine or the ratio of transmission ceased to be controlled. It has been tried to eliminate this drawback by means of springs, stops, and other expedients, but unsatisfactorily. This invention utilizes the fact that it is possible simply and correctly to control and regulate the two operating values $a$ and $n_1$, namely the position of the fuel supply regulating organs ($a$-value) and the number of revolutions of the engine ($n_1$)—the latter by regulating the transmission ratio $n_1/n_2$, independently of each other, but in dependence on a top value, namely the engine output. This makes it possible to observe the predetermined regulation characteristics.

The controls according to the invention comprise the following parts:

(a) The output selector, i. e. the adjusting organ to be operated by the driver.

(b) Two curved guides, kinetically depending on said adjusting organ, and means of adjustment or displacement, cooperating with the same, the one curved guide serving to adjust the fuel supply regulating organ, and the other to alter the number of revolutions.

(c) A differential mechanism, the first member of which is acted upon by said second curve according to the logarithm of the engine R. P. M., and the second member of which is influenced by a special device, e. g. a centrifugal governor, according to the logarithm of the R. P. M. of the driven shaft, whilst the third member, being dependent on said adjustment, acts on the control means (change-over) of the transmission gear.

The first of the said two curved guides is shaped according to the $a$ values of the regulation characteristics and the second according to the $n_1$ values. Also, their respective position is determined by the regulation characteristics, as a sole $a$ value and a sole $n_1$ value correspond to each given value of the engine output. While the fuel supply organ of regulation can be directly adjusted by the first curved guide and the adjusting motions appertaining thereto, a differential mechanism is necessary for obtaining the engine R. P. M. $n_1$, as predetermined by the regulation characteristics by adjusting the transmission ratio $n_1/n_2$. The motion of its three members must take place according to the logarithmic scale, as only in this manner it is possible to mechanically adjust the quotient of the engine R. P. M. $n_1$ and the driven shaft R. P. M. $n_2$, representing the ratio of transmission, so as to convert it into the difference of the motions of the first two members of the differential mechanism. Hence the third member is displaced according to the logarithm of the transmission ratio, which under the actual R. P. M. $n_2$ compels the engine to rotate at the prescribed $n_1$, provided that the third member is positively connected to the gear control means.

A further feature of the present invention resides in the addition of further curved guides which operate equally in dependence on the engine output, so as to bring about for any output the most favorable fuel-air ratio in the mixture, and the most favorable moment of ignition (ignition timing) in conformity with the regulation characteristics predetermined.

By means of the guiding principle disclosed in the present invention, namely, that the engine output is the governing or master value from which the other operating values are to be derived, it becomes possible to control by one single lever the fuel supply regulating organ, the engine speed (R. P. M.), the mixture formation, and the moment of ignition, while at the same time adjusting these values separately, so that any adjustment of said lever always yields a predetermined engine output.

With the above and other objects in view the invention further includes the novel features and details of construction to be hereinafter described, illustrated in the accompanying drawing, showing in Fig. 1 a diagrammatic representation of an embodiment of the invention, and in Fig. 2 a modified detail of it. Fig. 3 shows a further embodiment thereof.

In Fig. 1 numeral 25 refers to the internal combustion motor, 26 to the driving shaft, 27 to the transmission gear having several steps, and mechanisms for changing the ratio of transmission, 28 to the driven shaft, 29 to a centrifugal governor driven by same, 30 to a rod pivotable by the latter about a fixed point 31. The engine control member (power selecting organ) 1 on the one hand adjusts the fuel regulator 5 by way of the cam 3, and on the other hand prescribes to the motor a specified speed $n_1$ by the cam 4 displacing the rack 6 proportionally to the logarithm of the desired number of revolutions (speed) $n_1$. Cam 3 and cam 4 are formed in accordance with the engine characteristic determining the most efficient values of fuel supply and engine speed over the whole range of power. Furthermore, the rack 7 is shifted by the centrifugal governor 29 and the rod 30 in the opposite direction proportionally to the logarithm of the outlet speed $n_2$ of the gear. This imparts to the toothed wheel 8, located between the two racks, and consequently also to the rod 9 a movement proportional to the logarithm of the ratio transmission $i$. At the end of the rod 9 a sliding contact 10 is connected to a source of current 32, said contact gliding over the contacts 33, said contacts 33 being separately connected by electrical means with the electromagnetic switching elements 34 for the different steps of the transmission gear 27. The gear speeds are, consequently, put in according to the instantaneous position of the rod 9.

In a device of this kind a specified motor speed, and a specified position of the fuel regulator i. e. a specified power is coordinated to each position of the lever 1, whereas at the same time the operating condition of the internal combustion engine is independent of the driving conditions. Hence, with such a regulating arrangement the motor is compelled, for each power value demanded, to assume a certain position of the fuel regulator 5 and a certain number of revolutions (speed) i. e. a clearly defined operating condition. Consequently it is possible to act by way of the operating organ 1 also on the carburetter in such a manner as to make it produce the most favourable fuel and air mixture for the operating condition of the motor fixed by said operating organ.

The influence of the mixture formation can be exercised by all means known e. g. by altering the outlet opening of the nozzle, by throttling the current of air, or by providing for supplementary air. In Fig. 2 numeral 2 represents the shaft 2 of Fig. 1 adjusting the fuel unit 12 by way of the cam 3 and the finger 11. However, the finger 11 does not only displace the valve 19 for the fuel jet, but acts also on means 20 for supply of supplementary air and on means 21 for altering the outlet opening of the fuel nozzle. These three organs 19, 20, 21 are controlled by links 13, 14 and 15 with cam slots 16, 17, and 18 so as to coordinate the most economical formation of a fuel and air mixture to the operating condition of the motor determined by the position of the power selecting organ 1. (Fig. 1).

Instead of the design according to Fig. 2 it is possible as shown in Fig. 3 to employ special cams as means for altering the fuel and air mixture, all these cams being fastened to the same shaft 2. Cam 3 is used for adjusting the throttle valve 21, whilst cam 22 alters the position of the additional air throttle valve 20, and the cam 23 the fuel jet 19.

By influencing the formation of the mixture with a view of warranting the highest degree of economical efficiency the mixture gets much weaker in the intermediate power range than in the upper ranges. However, the poorer mixture calls for an advance of the ignition for actually realizing the maximum of economical efficiency. Hence, with controls of this kind, the timing in view of an advanced ignition can also be operatively coordinated to each position of the driver's power selecting organ so that the ignition is advanced in proportion to the mixture weakening.

For this purpose, Fig. 3 discloses a further cam 24, also fastened to the shaft 2 which, by way of a finger and by the lever 35, brings about the adjustment of the control organ 36 for timing the regulation.

The devices disclosed are not only of importance for automotive vehicles. They may be applied advantageously also to rail motor cars, airplanes and the like.

I claim:

In a drive for an automotive vehicle containing an internal combustion engine, a transmission gear, a driving and a driven shaft, the combination comprising the following elements: an adjusting organ, operated by the driver for all driving and braking output values of the engine, two curved guides, kinetically coupled with said adjusting organ, a differential mechanism, and control means for adjusting the ratio of transmission, adjusting means controlled by the first of the said curved guides for regulating the fuel supply, both curved guides being shaped according to a predetermined regulation characteristic of the engine, and specifically the first being shaped according to the positions of the fuel supply regulating organ predetermined for each output and the second according to the values of the theoretical number of revolutions of said engine predetermined for the same output, a governor controlled by the number of revolutions of the driven shaft of said transmission gear, the first member of the differential mechanism being moved by the second curved guide according to the logarithm of the theoretical values of the number of revolutions of the engine, the second member of the differential mechanism being moved by said governor according to the logarithm of the number of revolutions of the driven shaft of said transmission gear, the third member moving in dependence on said two first members, and being connected to the transmission gear control means so as to act thereupon.

KARL HEFEL.

REFERENCES CITED

The following references are of record in the file of this patent:

UNITED STATES PATENTS

| Number | Name | Date |
|---|---|---|
| 905,637 | Beskow | Dec. 1, 1908 |
| 1,238,481 | Benjamin | Aug. 28, 1917 |
| 1,469,149 | Church | Sept. 25, 1923 |
| 1,483,883 | Hillhouse | Feb. 19, 1924 |
| 2,008,231 | Vincent | July 16, 1935 |
| 2,330,388 | Scott-Paine | Sept. 28, 1943 |

FOREIGN PATENTS

| Number | Country | Date |
|---|---|---|
| 455,558 | Germany | Feb. 3, 1928 |
| 889,074 | France | Dec. 30, 1943 |